(12) United States Patent
Hsieh et al.

(10) Patent No.: US 6,462,349 B1
(45) Date of Patent: Oct. 8, 2002

(54) MEASURING SPACING BETWEEN TWO SURFACES VIA EVANESCENT COUPLING

(75) Inventors: Yung-Chieh Hsieh; Lily Zheng; Roger Hajjar; Sanjai Parthasarathi, all of San Jose, CA (US)

(73) Assignee: Terastor Corporation, San Jose, CA (US)

( * ) Notice: Subject to any disclaimer, the term of this patent is extended or adjusted under 35 U.S.C. 154(b) by 0 days.

(21) Appl. No.: 09/407,158

(22) Filed: Sep. 28, 1999

(51) Int. Cl.[7] .............................. G01N 21/86; G01V 8/00
(52) U.S. Cl. .............................. 250/559.26; 250/559.22; 250/234
(58) Field of Search .............................. 250/216, 227.11, 250/227.2, 227.24, 227.26, 234, 235, 559.22, 559.26, 306, 307, 225; 73/105; 356/359

(56) References Cited

U.S. PATENT DOCUMENTS

| | | | | |
|---|---|---|---|---|
| 5,004,307 A | * | 4/1991 | Kino et al. ................ | 350/1.2 |
| 5,125,750 A | * | 6/1992 | Corle et al. ............... | 359/819 |
| 5,220,403 A | * | 6/1993 | Batchelder et al. ......... | 356/345 |
| 5,446,547 A | * | 8/1995 | Guenther et al. ........... | 356/357 |
| 5,602,820 A | * | 2/1997 | Wickramasinghe et al. . | 369/126 |
| 5,677,805 A | * | 10/1997 | Parker et al. .............. | 360/75 |
| 5,859,364 A | * | 1/1999 | Toda et al. ................. | 73/105 |
| 5,883,872 A | * | 3/1999 | Kino ......................... | 369/112 |
| 5,939,709 A | * | 8/1999 | Ghislain et al. ............ | 250/216 |
| 6,014,166 A | * | 1/2000 | Guerra ....................... | 348/79 |
| 6,046,448 A | * | 4/2000 | Sato et al. .................. | 250/234 |
| 6,094,413 A | * | 7/2000 | Guerra ....................... | 369/275.1 |
| 6,125,008 A | * | 9/2000 | Berg et al. ................. | 360/264.4 |
| 6,178,157 B1 | * | 1/2001 | Berg et al. ................. | 369/300 |

OTHER PUBLICATIONS

Michael A. Paesler & Patrick J. Moyer, Near–Field Optics, 1996, pp. 146–149, 318–321.*

* cited by examiner

Primary Examiner—Stephone Allen
Assistant Examiner—Eric Spears
(74) Attorney, Agent, or Firm—Fish & Richardson P.C.

(57) ABSTRACT

A near-field optical system having a mechanism to determine a spacing between an optical surface and a reflective surface that are spaced by less one wavelength by using coupled radiation energy that has an evanescently-coupled portion.

23 Claims, 13 Drawing Sheets

MEASURING SPACING BETWEEN TWO SURFACES VIA EVANESCENT COUPLING

BACKGROUND

The present disclosure generally relates to energy coupling in optical systems, and more particularly, to optical systems operating in near-field configurations.

Radiation energy can be coupled between two objects at least in part by evanescent waves when the objects are in a near-field configuration, i.e., they are separated from each other by a distance approximately equal to or less than one wavelength of the radiation. One unique feature of near-field coupling is that a beam can be focused to a spot that has a size smaller than the minimum size set by the diffraction of the radiation. An optical system based on the near-field coupling can produce an optical numerical aperture greater than unity.

The near-field coupling may be used in various applications. For example, the spatial resolution of an imaging system can be increased beyond the diffraction limit, such as in a near-field microscope. An optical storage system may also achieve a high areal storage density by implementing a specially-constructed optical head to operate in a near-field configuration with respect to the storage media.

SUMMARY

A radiation signal that has at least a portion evanescently coupled from one surface to another is sensitive to the variation of the spacing between the surfaces. Hence, it may be desirable to maintain the spacing at a desired constant within a predetermined tolerance range, or to filter or modify the received signal to minimize or remove any effect caused by the spacing variation. Therefore, a mechanism of measuring the spacing variation between the two surfaces in the near-field configuration is desirable, particularly when such measurements need to be done in real time during the operation of a near-field optical system.

One embodiment of such a near-field optical system has an optical head, an optical signal-selecting device, a radiation detector, and a processing circuit. The optical head has an optically transparent interfacing surface that couples radiation energy at least in part by evanescent fields to and from a reflective surface that is spaced from the interfacing surface by less than one wavelength. The optical signal-selecting device is in an optical path of received radiation energy from the reflective surface by the optical head to select a radiation signal from the received radiation energy. This selected radiation signal includes an evanescent-coupled component and varies with a spacing between the interfacing surface and the reflective surface.

The radiation detector is disposed to receive and convert the radiation signal into an electrical signal radiative of the spacing between the interfacing surface and the reflective surface. The processing circuit is coupled to process this electrical signal to determine the spacing.

The above system may be configured as an inspection system to determine the degree of the flatness of optical disks, magnetic disks, or other flat surfaces. It may also be incorporated in a near-field optical disk drive to monitor the spacing between the optical head and the disk during operation.

These and other aspects and associated advantages will become more apparent in light of the following detailed description, the accompanying drawings, and the appended claims.

DETAILED DESCRIPTION

A near-field optical system may couple optical energy between two surfaces separated by less than one wavelength at least in part by evanescent coupling. The coupled signal may also include optical energy that is coupled by the propagating waves. Such a coupled radiation signal generally varies with the spacing between the surfaces. The present disclosure recognizes that this variation can be used to measure the spacing and its variation.

It is also recognized that, although optical signals having evanescently-coupled components vary with the spacing between the two surfaces, certain signals may be more sensitive to the spacing variation than others. A particular component of a signal may be more sensitive to the spacing variation than another component of the same signal. It is therefore desirable to select a proper signal or signal component that has a high sensitivity to the spacing to measure the spacing between the surfaces.

In addition, the present inventors discovered that some optical signals may increase their magnitudes with the spacing while others may decrease. Hence, accurate determination of the spacing and the spacing variation between the two surfaces can provide important information for design and optimization of near-field optical systems.

Furthermore, the present techniques may be used to achieve a high-resolution topographic measurement of a surface. The lateral spatial resolution along the surface is beyond the diffraction limit due to a high effective numerical aperture caused by the evanescent coupling. The vertical resolution for measuring the height variation of the surface is determined by the variation of the selected signal as a function of the spacing. Since the evanescent coupling has a strong dependence on the spacing, a vertical resolution on the order of about a few nanometers can be achieved.

Figure 1:
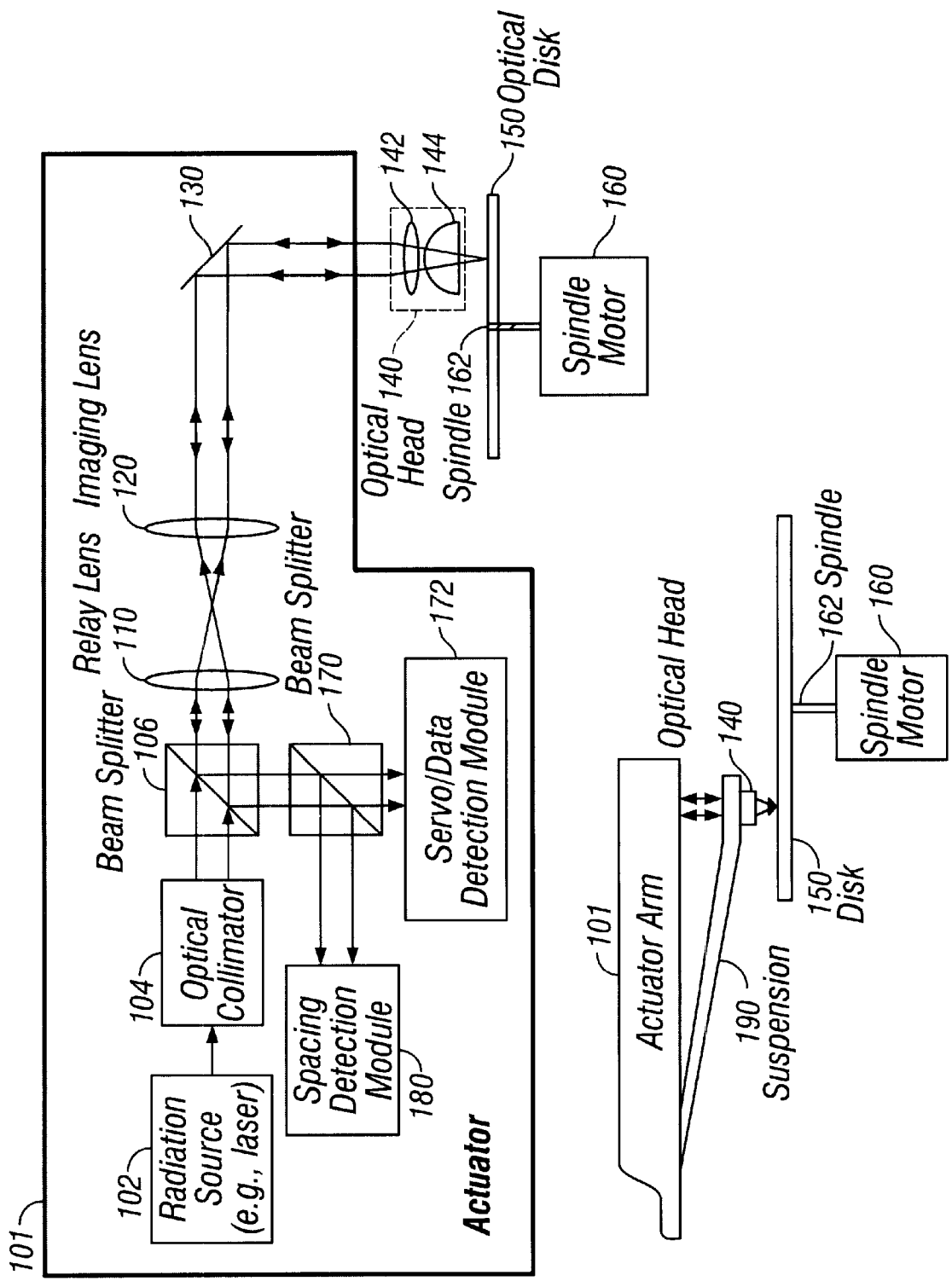
FIGS. 1A and 1B illustrate one embodiment of a near-field optical disk drive having a detection module for measuring the spacing between an optical interfacing surface of the optical head and the disk surface.
Figure 2:
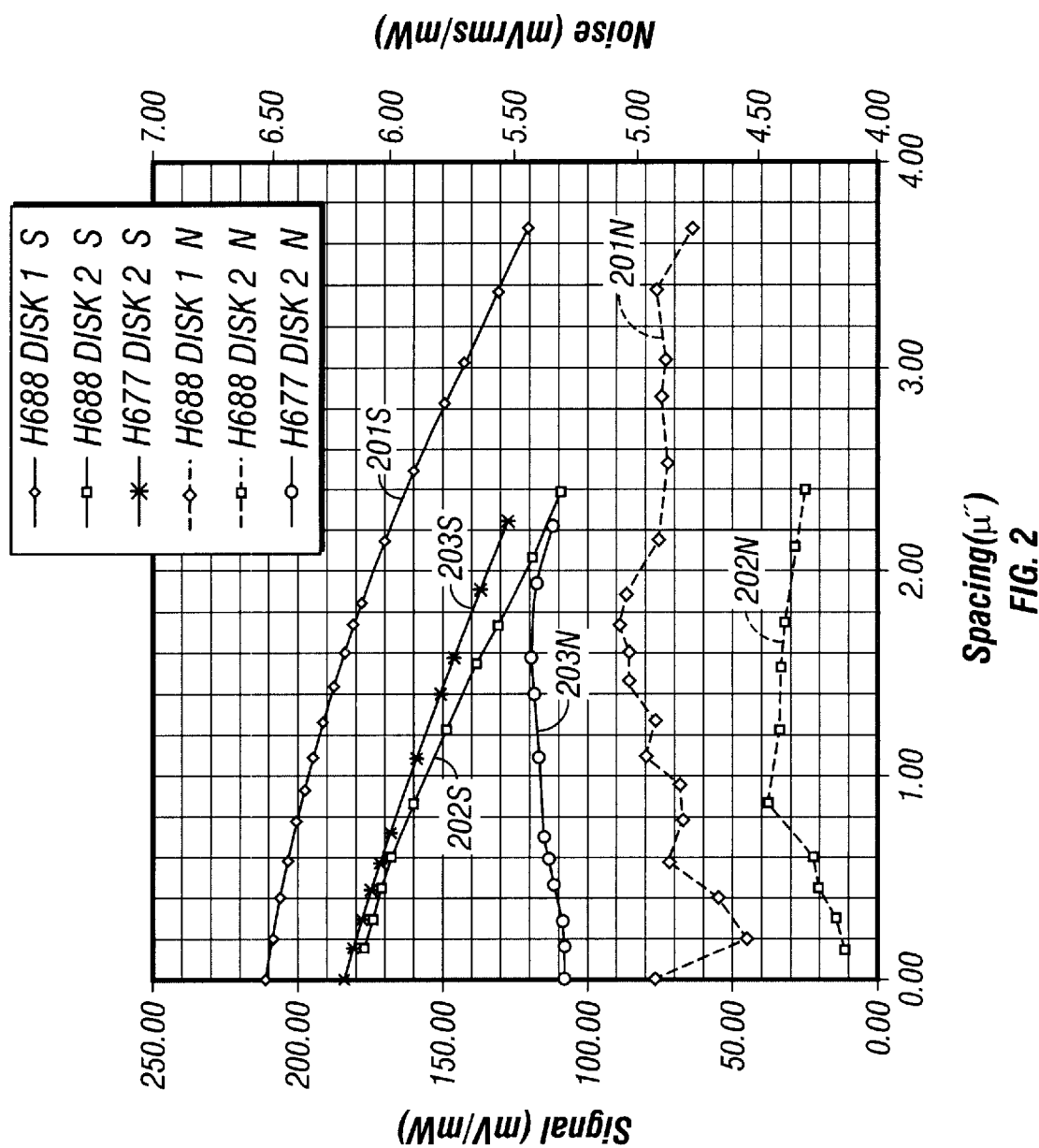
FIGS. 2 through 7 show various measured optical signals as a function of the spacing between an optical interfacing surface of the optical head and the disk surface in the disk drive shown in FIGS. 1A and 1B, where the spacing axis is labeled in microinches (i.e., 1 microinch=25.4 nm).

The above aspects of the present techniques will now be described with a specific reference to a near-field optical storage system as an example. FIG. 1A is block diagram showing some basic features of a near-field optical disk drive in one embodiment. A radiation source 102 such as a laser produces a beam at a specified wavelength for recording and retrieving data. An optical disk 150 includes at least one storage layer for data storage. The storage layer is formed of a suitable material such as a magneto-optical material or phase-change material. Data is spatially distributed and stored in the storage layer by a suitable encoding method. An optical beam from the radiation source 102 is collimated by an optical collimator 104 and then is projected to an optical head 140 by a relay lens 110 and an imaging lens 120.

A disk holding device such as a spindle 162 holds the optical disk 150. The optical head 140 is placed relative to the disk 150 by the air bearing action at a distance less than one wavelength so that the evanescent waves can be transferred between the optical head 140 and the disk 150. The optical disk 150 may be a removable medium or a fixed medium. A spindle motor 160 is coupled to the spindle to rotate the disk 150 around the spindle 162 at a desired speed.

The optical head 140 is configured to produce a lensing effect and thereby to focus the beam to a desired recording layer in the disk 150. The optical head 140 has a flat interfacing optical surface that interfaces with the disk 150 and is spaced from the disk 150 by a thin air gap that is a fraction of one wavelength. The present techniques are developed to measure the variation of the spacing between this interfacing optical surface and the surface of the disk 150. In one embodiment, the optical head 140 includes an objective lens 142 and a solid immersion lens ("SIL") 144. The SIL 144 has a spherical surface facing the objective lens and a flat surface that functions as the interfacing optical surface. The flat surface of the SIL 144 opposes the spherical surface and faces the optical disk 150.

The optical head 140 also couples the reflected beam from the disk 150 to a servo and data detection module 172 that includes at least one data detector to extract data signals from the reflected beam and a servo detector to produce a tracking error signal indicating the relative position of the beam from a desired track on the disk. A beam splitter 106 may be disposed to guide the reflected beam from the disk 150 to the detection module 170.

A spacing detection module 180 is implemented to monitor and measure a selected optical signal in the reflected optical signal that is received by the optical head 140 from the disk 150. A beam splitter 170 is positioned between the beam splitter 106 and the servo and data detection module 172 to send a fraction of the reflected beam to the spacing detection module 180. The module 180 determines the spacing and its variation between the optical head 140 and the disk 150 by measuring the signal variation of the selected signal.

An actuator 101 of either a linear type or a rotary type is implemented to position the optical head 140 over a desired position of the disk 150. The optical head 140 may have an air-bearing surface to allow the head 140 to fly. FIG. 1B shows that the optical head 140 may be attached to the actuator 101 by a flexible suspension arm 190 so that the optical head 140 is supported over the disk 150 at a desired spacing by an air bearing. The disk 150 spins around the spindle 162, the relative motion between the optical head 140 and the disk 150 creates an air bearing force to lift the head 140 over the disk surface.

All other optical elements in the optical train, including the light source 102, the detection modules 172 and 180 and beam guiding elements, may be attached to the actuator 101 with a predetermined spatial relation with one another. Alternatively, these optical elements may be attached to a baseplate of the disk drive and do not move with the actuator 101. A reflector 130 may be fixed to the actuator 101 or the optical head 140 so that the beam impinging upon the disk 150 is substantially perpendicular to the disk surface.

In the near-field configuration, optical signals received by the servo and data detection module 172 that have evanescently-coupled components can change significantly with the spacing between the interfacing optical surface of the head 140 and the surface of the disk 150. FIGS. 2 through 7 provide some examples of such signals when the disk drive of FIGS. 1A and 1B is a magneto-optical drive. Note that some signals increase with the spacing while others decrease with the spacing. This difference in various signals having evanescently-coupled components affects how the spacing be set to optimize the performance of a disk drive.

FIG. 2A shows measured magneto-optic ("MO") signals and respective noise signals as a function of the spacing between the interfacing optical surface and the disk surface. Curves 201S and 201N, and 202S and 202N represent the MO signals and the noise for an optical head H688 with a first disk and a second disk, respectively. Curves 203S and 203N represent the MO signal and the noise for another optical head H677 with the second disk. Hence, the MO signals decrease as the spacing increases.

Figure 3:
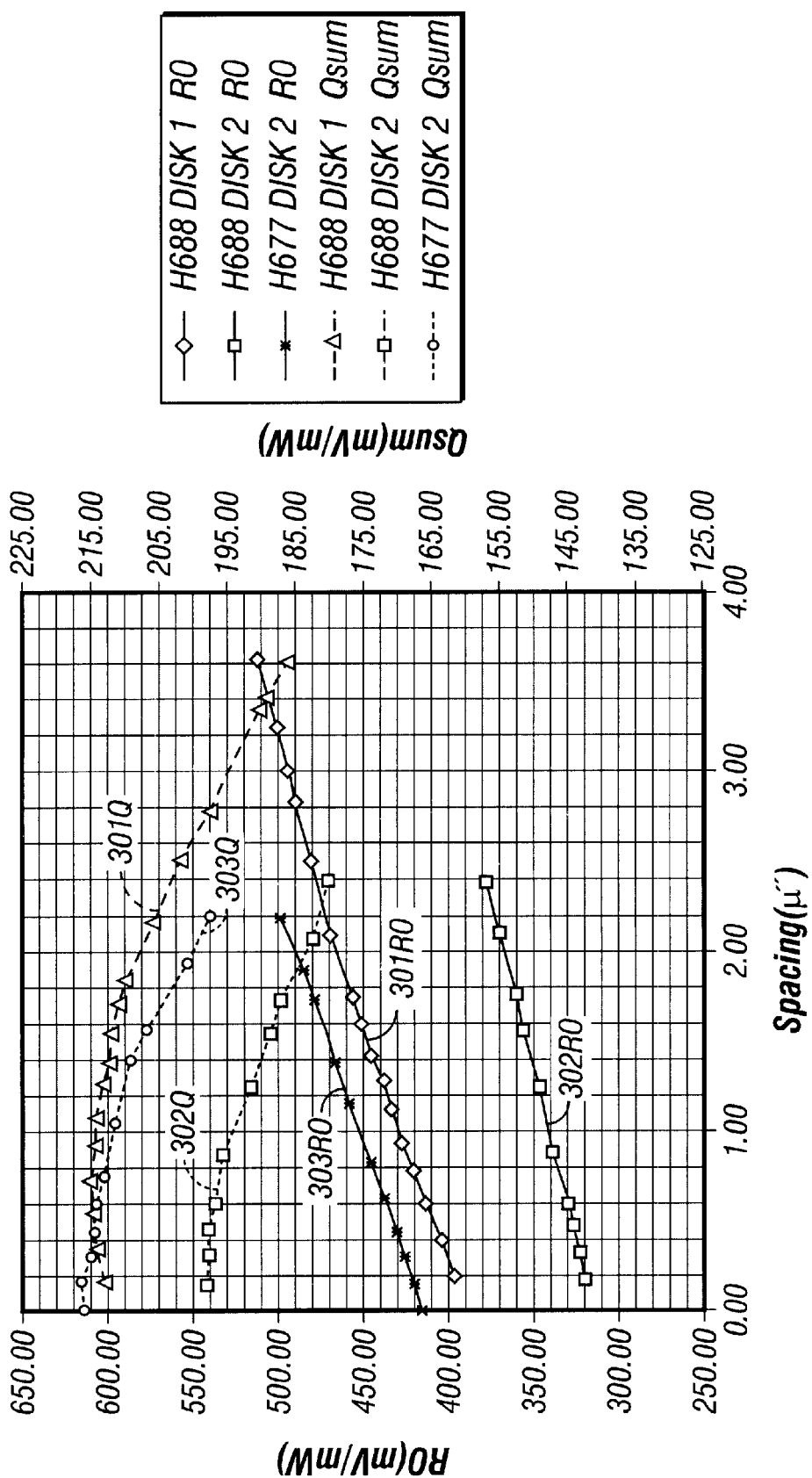
Figure 4:
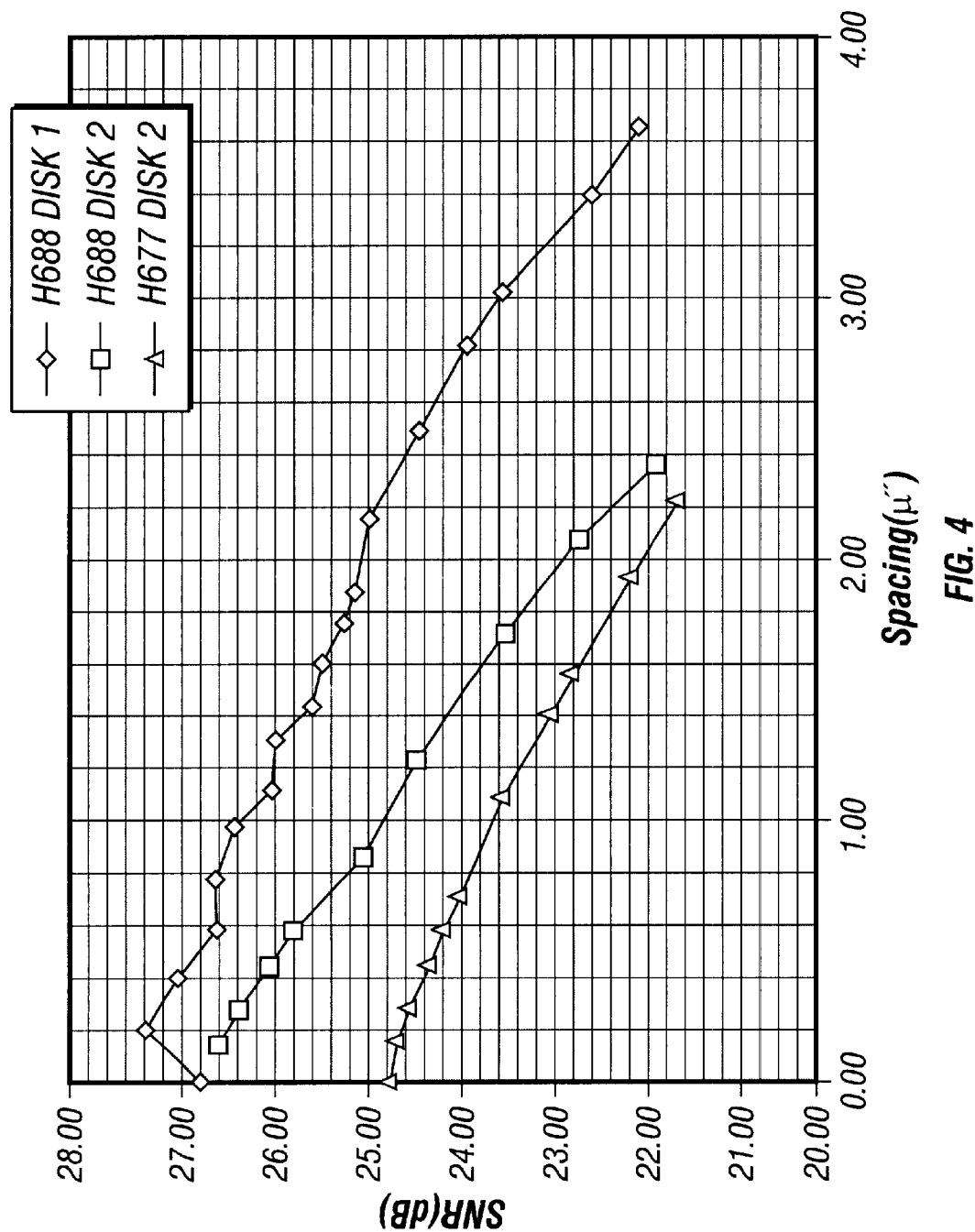
Figure 5:
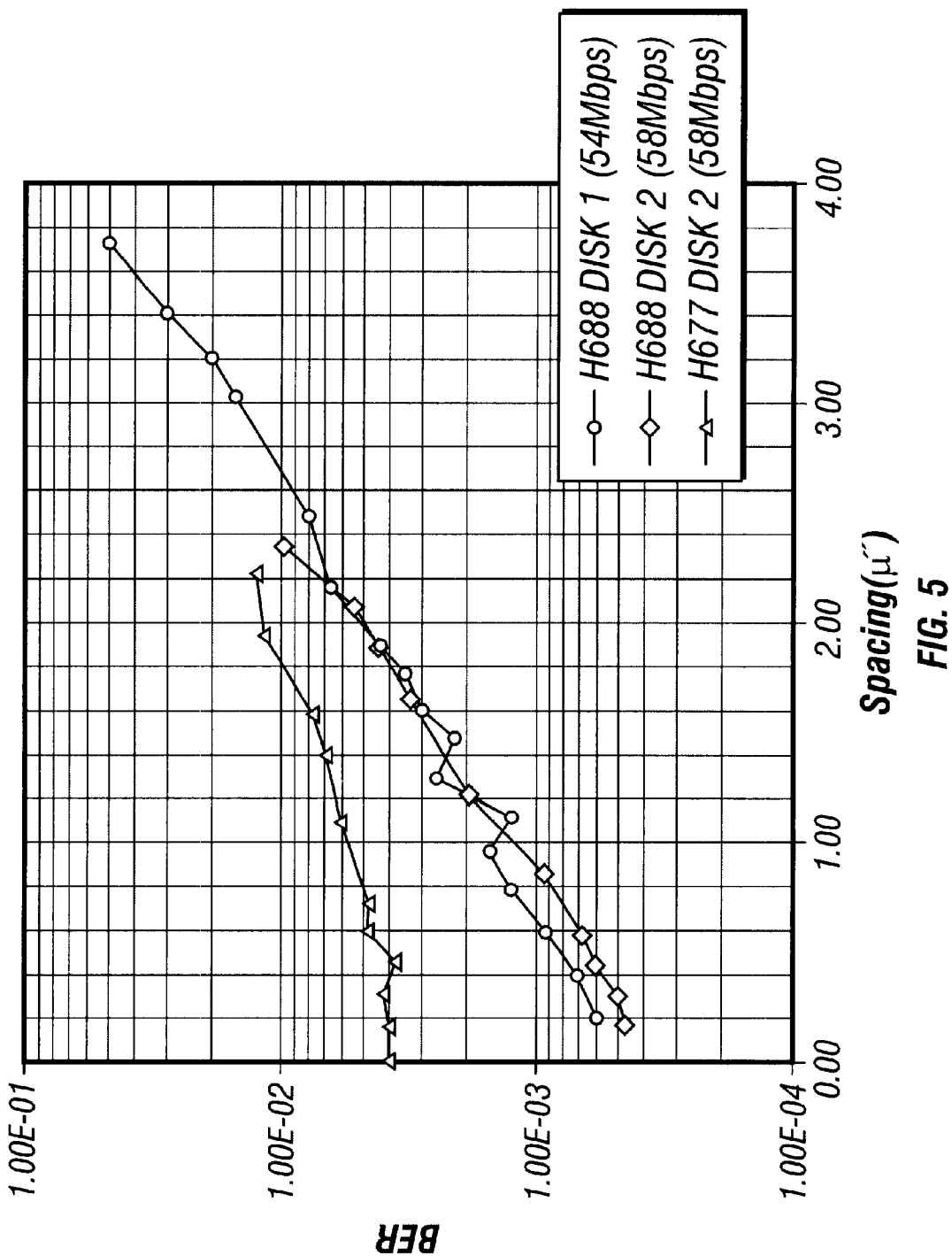
Figure 6:
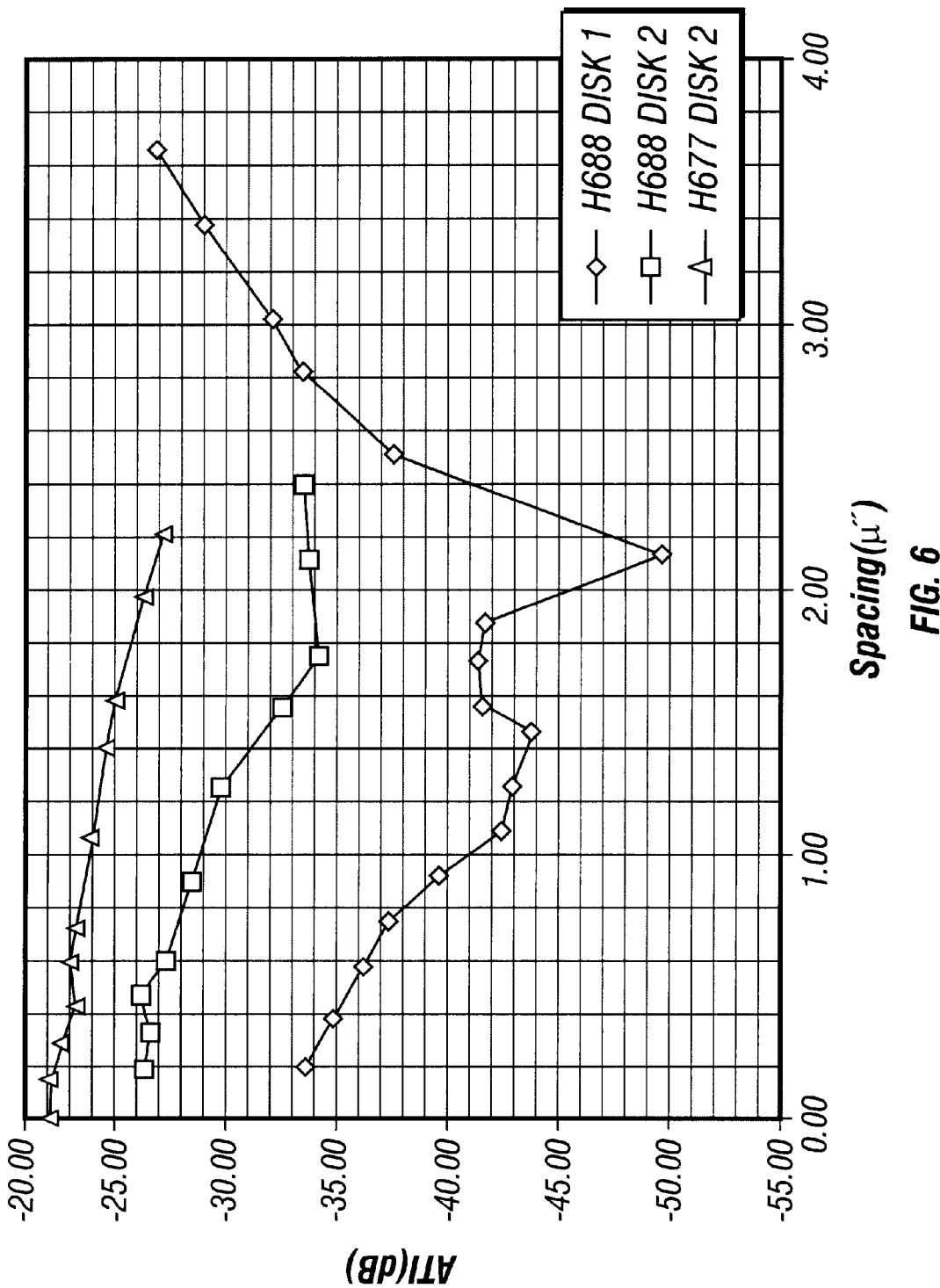
Figure 7:
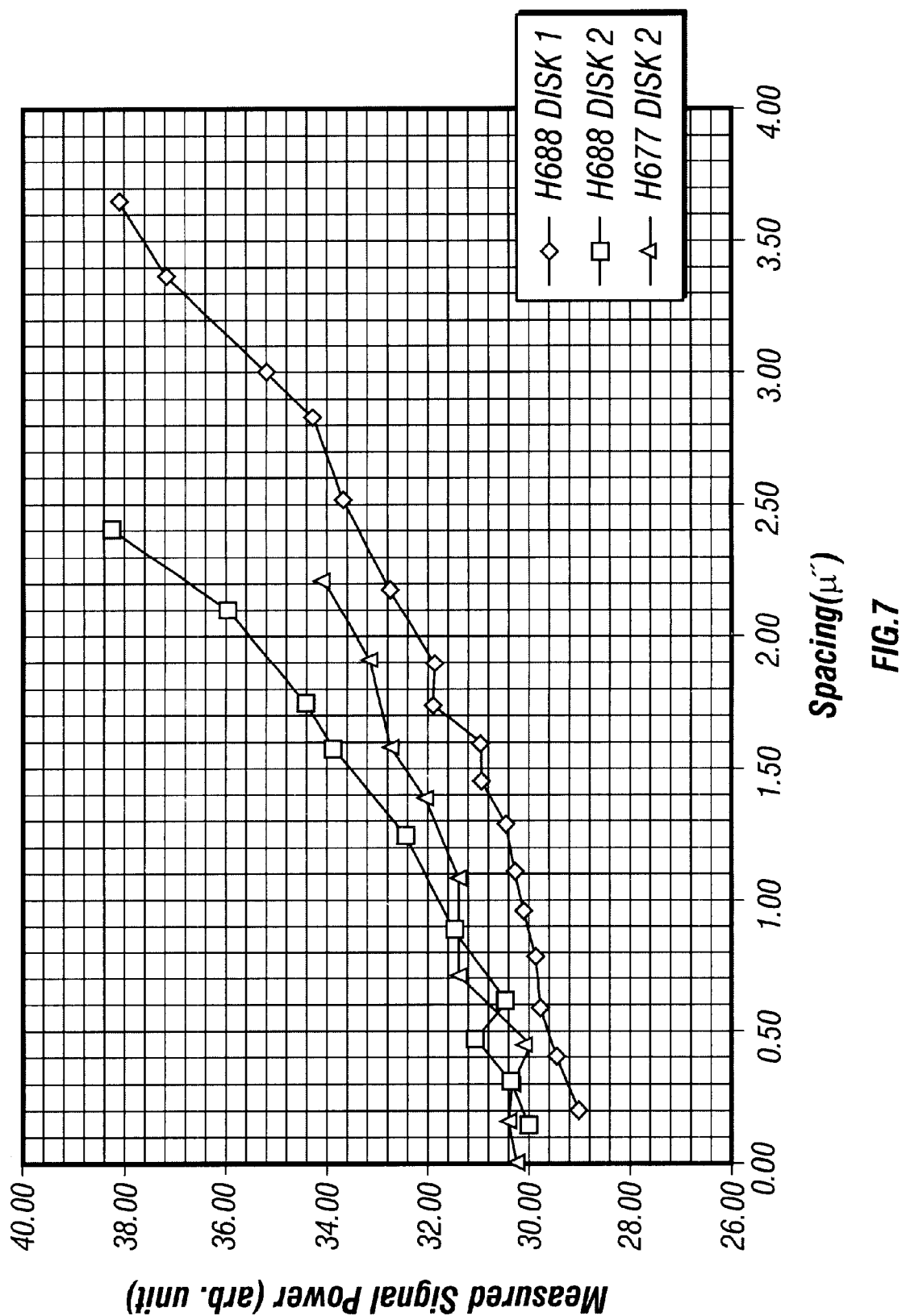

The measured sum signals from all segments of the data detector also decrease as the spacing increases. In FIG. 3, curves 301Q and 302Q represent the sum signals for the optical head H688 with a first disk and a second disk, respectively. Curve 303Q represents the sum signal for the optical head H677 with the second disk. However, the measured read-only signals increase with the spacing as indicated by curves 301RO, 302RO, and 303RO.

FIGS. 4 through 7 respectively show measured signal-to-noise ratios (SNR), bit error rates (BER), adjacent track interference (ATI) signals, and the resolution signals as a function of the spacing for different head-disk combinations. The measurements indicate that different signals can behavior differently with the air gap spacing and the film stack structures of the optical disks.

The present inventors discovered that certain optical signals are more sensitive to the air gap spacing than other optical signals. These more sensitive signals can be used to measure the spacing variation with high resolution. When properly calibrated, the absolute spacing can also be measured. The spacing detection module 180 is configured to use one or more of such highly sensitive signals to monitor the spacing variation in real time during the operation of the disk drive.

One such optical signal suitable for sensing the air gap spacing is a new polarization component generated from the coupling between the optical head 140 and the disk 150 through the air gap. When a linearly-polarized beam is coupled to the optical head 140 from the radiation source 102, the optical head 140 focusses the incident beam to the interfacing surface of the head 140 and the air gap. Each light ray in the focussed beam is bent differently than another light ray. For example, light rays impinging the outer area of the optical head 140 is bent more than the rays impinging the central part of the optical head 140.

The polarization of each ray incident to the interfacing surface can be decomposed into two mutually orthogonal polarization components, P and S, relative to an incident plane that is defined by the wavevector and the normal direction of the interfacing surface. The S polarization component is perpendicular to the incident plane while the P component is perpendicular to the S component on the incident plane. Since the wavevectors of different rays are generally different, the amounts of P and S polarization components of one light ray at the interfacing surface are also different from those of another ray.

The reflected P and S components of each ray can have different reflectivities and phase changes from the air gap and the surface of the disk 150. This difference can be caused by the structure of the film stack of the disk 150. Hence, the polarization state of each reflected ray is changed after passing through the optical head 140 upon reflection from the air gap and the disk 150. The reflected ray from the optical head 140 is no longer linearly polarized along the incident polarization, but has a newly-generated cross polarization that is perpendicular to the incident polarization. Different reflected rays generally have different amounts of cross polarization depending on their radial and angular position when they first enter the optical head 140 from the light source 102, e.g., their radial and angular position on the objective lens The ratio between the cross polarization and the original incident polarization in the reflected beam is in part determined by the numerical aperture of the optical head 140. When the numerical aperture increases, the bending of the input light rays at the outer radius of the objective lens 142 by the focusing action of the optical head 140 increases. Hence, the incident angles increase accordingly. As a result, for a given film structure of the disk 150 and the air gap, the percentage of the cross polarization in the reflected beam increases. In the near-field configuration, the cross polarization mainly has contributions from light rays with large incident angles that are greater than the critical angle for total internal reflection. The energy of such light rays can be only coupled through the air gap by evanescent fields. Since the evanescently-coupled energy exponentially decays with air gap, the cross polarization light is sensitive to the air gap spacing. The cross polarization in the reflected light, therefore, can be used to monitor the air gap.

The inventors discovered that, in the near-field configuration, the newly-generated cross polarization strongly depends on the air gap spacing in a monotonic manner. As the air gap increases within the near-field configuration, the intensity of the cross polarization in the reflected light increases monotonically for different film stack structures on the disk 150. Hence, one intensity value of the cross polarization uniquely corresponds to one air gap spacing. The rate of change in the cross polarization with the air gap depends on the film stack of the disk 150.

The reflected light in the incident polarization also has a dependence on the air gap. However, due to interference, this signal oscillates with the air gap with a period of about one half of the wavelength. In addition, this dependence on the air gap of the reflected light in the incident polarization is strongly associated with the specific configuration of the film stack. The structure of the film stack can affect at least the amplitude and the phase of the reflected light of the incident polarization. Thus, the reflected light in the incident polarization generally varies from one film stack structure to another. For example, the intensity of the reflected light of the incident polarization may increase with the air gap within a desired spacing range (e.g., from 0 to 175 µm) for one film structure but may decrease for other film structures.

Therefore, the reflected light in the cross polarization is better suited for monitoring the air gap. The cross polarization can be separated from the reflected light of the incident polarization by using, e.g., a polarizing beam splitter. The separated cross polarization is then detected to monitor the variation of the air gap.

Figure 8A:
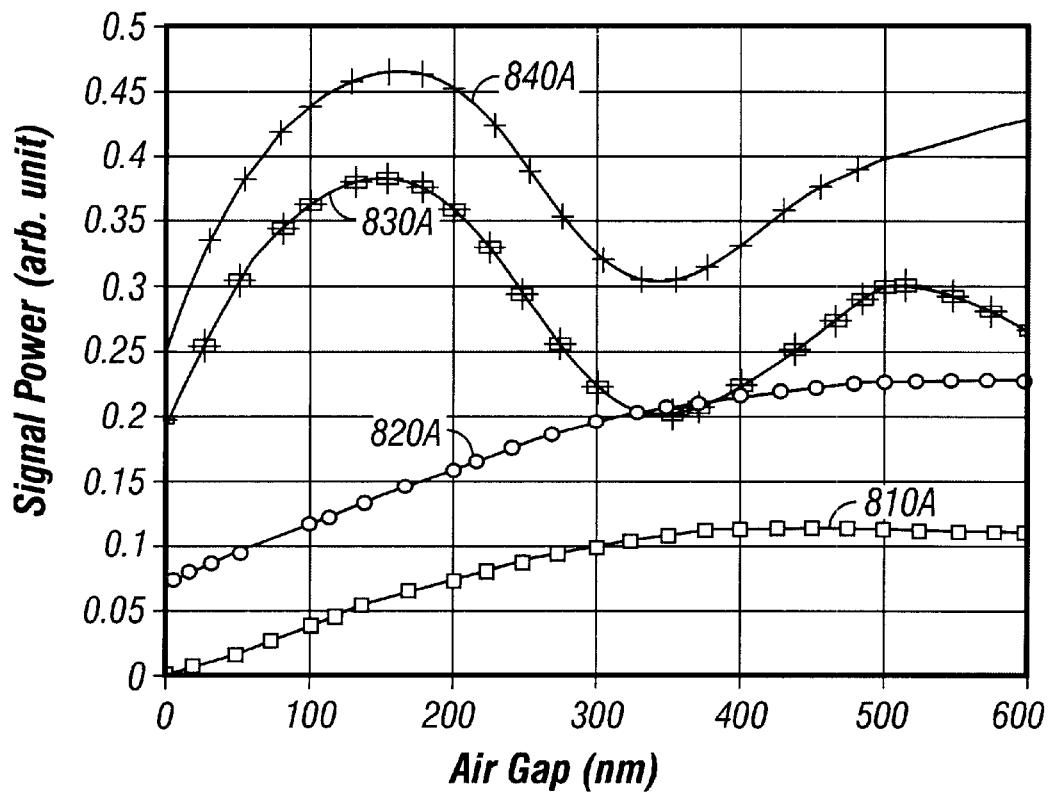
FIGS. 8A, 8B, and 8C show calculated signals as a function of the air gap spacing.
Figure 8B:
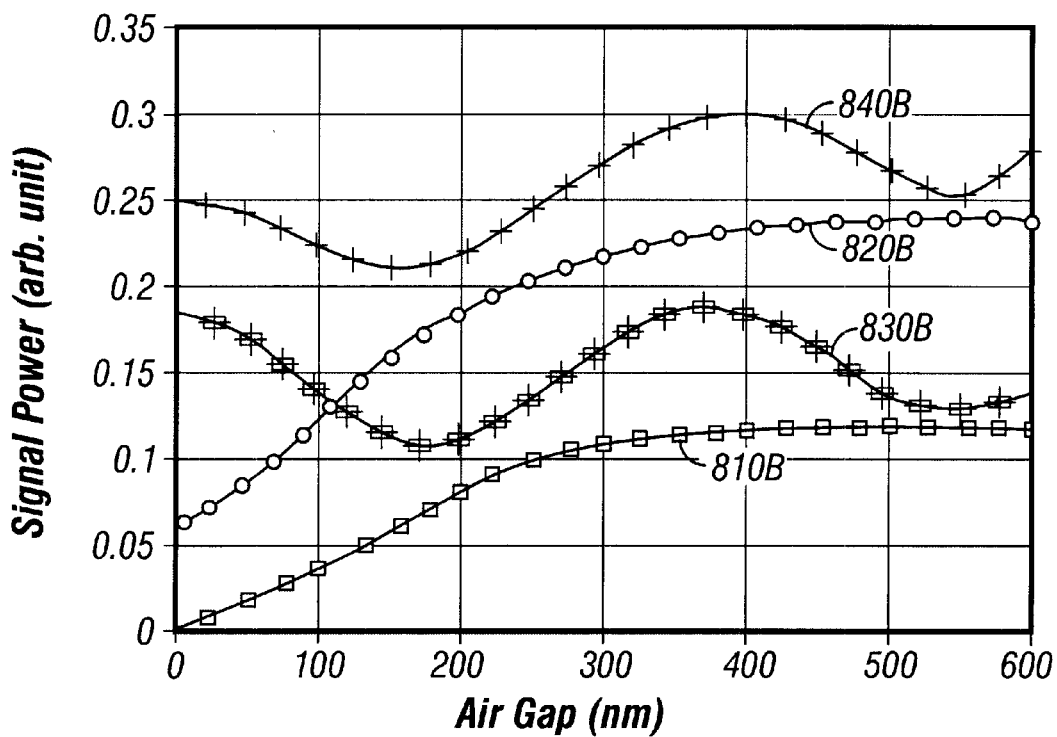
Figure 8C:
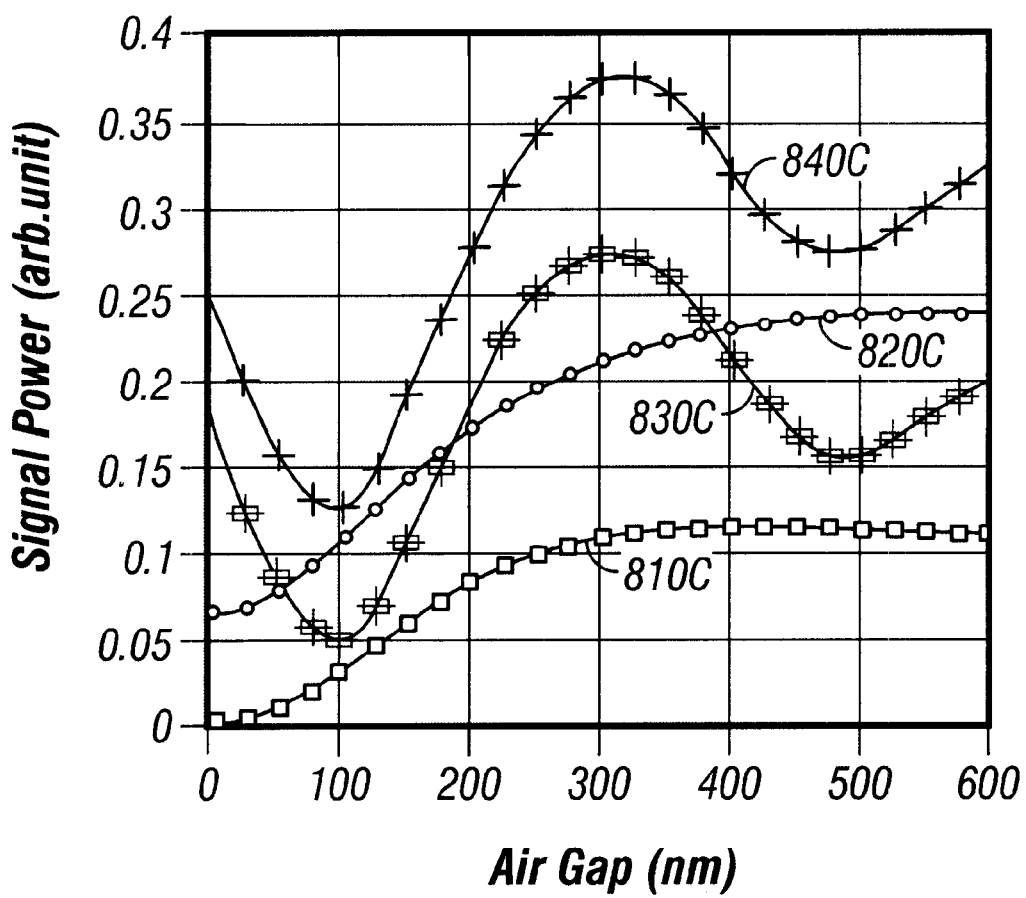

FIGS. 8A, 8B, and 8C show simulated results of different reflected signals as a function of the air gap for different film structures on the disk 150. FIG. 8A shows the signals for a underlaying film stack with a top dielectric layer of 20 nm in thickness. Curves 810A and 820A represent the reflected cross polarization signal and the reflected signal that has only evanescently-coupled energy in all polarizations. Both reflected signals monotonically increase with the air gap and hence can be used to monitor the air gap and its variation. In contrary, the reflected light in the incident polarization and the reflected propagation light of all polarizations, respectively represented by curves 840A and 830A, oscillate with the air gap.

FIGS. 8B and 8C show the reflected signals for optical disks with the same underlaying film stack but with different top dielectric layers of 60 nm and 80 nm thick, respectively. The behaviors of the reflected cross polarization signal and the evanescently-coupled reflected signal (810B, 820B, and 810C, 820C) are essentially unchanged, i.e., monotonically increase with the air gap, with different disks. However, the behaviors of the reflected light in the incident polarization and the reflected propagation light (840B, 830B, and 840C, 830C) change with the thickness of the top dielectric layer. When the top layer is 30 nm as in FIG. 8A, the reflected light in the incident polarization and the reflected propagation light increase with the air gap in the range from 0 to about 150 nm. When the top layer is 60 nm thick, the reflected light in the incident polarization and the reflected propagation light decrease, rather than increase, with the air gap changing from about 0 to about 175 nm (FIG. 8B). The reflected light in the incident polarization and the reflected propagation light decrease with the air gap in the range from about 0 to about 175 nm but become to increase with the air gap in the range of about 175 nm to about 375 nm. Hence, the dependence on the air gap of the reflected light in the incident polarization and the reflected propagation light in the range of 0 to about 150 nm changes in a non-monotonic manner with film structure on the disk 150. As a result, these two signals are not suitable for monitoring or measuring the air gap when the disk drive shown in FIGS. 1A and 1B operates at an air gap in this range.

Figure 9:
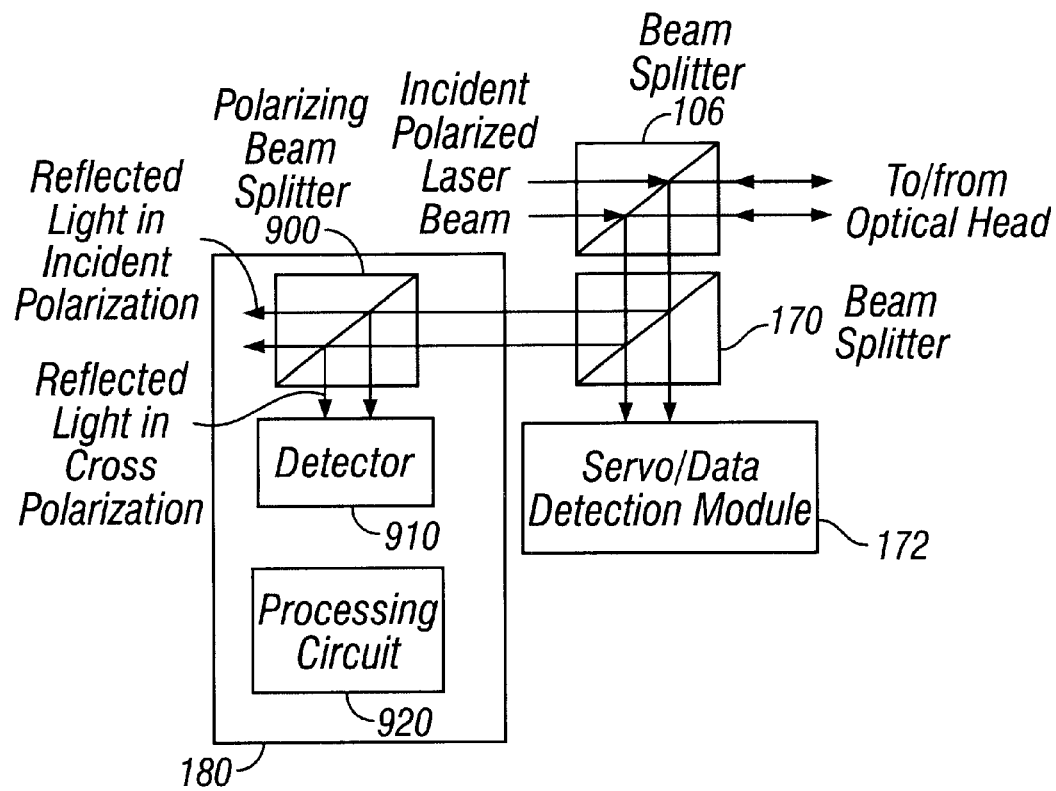
FIG. 9 shows one embodiment of a space detection module for the disk drive in FIGS. 1A and 1B by using reflected light in a polarization that is perpendicular to the incident polarization from the optical head.

The optical disk drive shown in FIGS. 1A and 1B may implement the spacing detection module 180 in a configuration as shown in FIG. 9 to monitor the spacing variation by using the reflected light in the cross polarization. A polarizing beam splitter 900 is disposed relative to the beam splitter 170 as a signal-selecting device to separate the light in the cross polarization from the reflected light in the incident polarization. A photodetector 910 is used to receive and detect the reflected light in the cross polarization for monitoring the air gap spacing. A processing circuit 920 processes the signal from the detector 910 to determine the spacing variation or the absolute spacing.

The received intensity signal of the reflected light in the cross polarization by the detector 910 can be calibrated to indicate the amount of spacing variation or the absolute value of the spacing. One calibration for measuring the spacing variation uses two reference points with a known height difference. The optical head 140 can fly at different heights by changing the speed of the spindle motor 160 to obtain different amounts of reflected signals in the cross polarization with respect to the two reference points.

For example, the height difference between preformed grooves and lands in an optical disk is known or can be measured, e.g., by using an atomic force microscope. When the optical head 140 is flying at a constant height relative to a reference point on the disk 150, the actual air gap spacing between the optical head is at a high value when it is positioned over a groove and at a low value when it is positioned over a land. Hence, the intensity of the reflected light in the cross polarization has two different intensity values at each flying height. Measurements of the two different intensity values corresponding to grooves and lands at different flying heights provide a calibration between the intensity of the reflected light in the cross polarization and the flying height.

Figure 10:
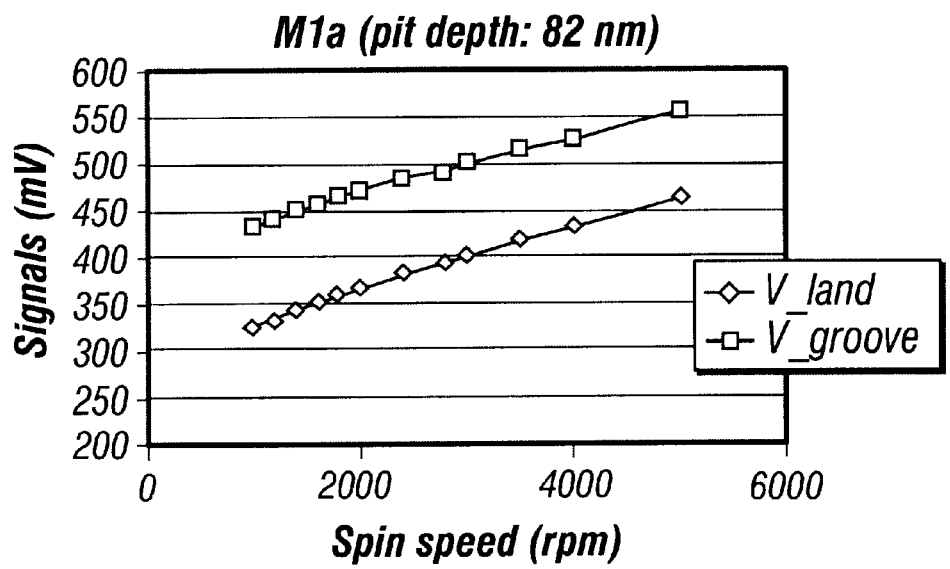
FIGS. 10 and 11 show measured DC level of the read-only signal in a polarization perpendicular to the incident polarization as a function of the spin speed of the spindle motor for two different disks.
Figure 11:
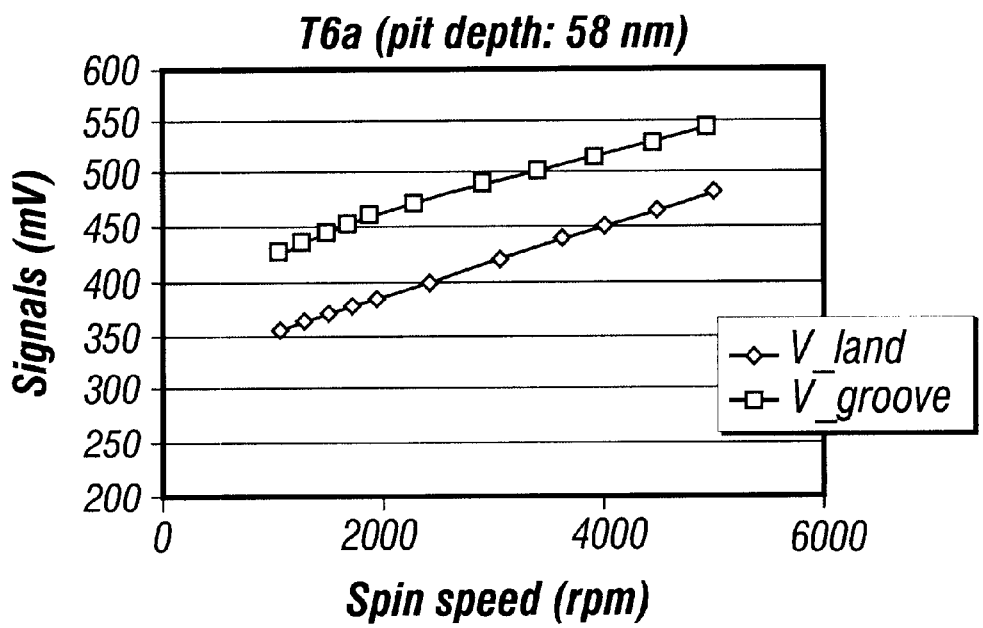

FIGS. 10 and 11 show measured DC level of the read-only signal in the cross polarization as a function of the spin speed of the spindle motor 160 for two different disks. The flying height of the optical head 140 is essentially proportional to the linear speed of the part of the disk 150 over which it is positioned. The intensity of the reflected light in the cross polarization approximately has a linear relationship with the flying height within a range (e.g., over 50 nm).

Table 1 shows the summary of the calibration results for the two tested disks using the same optical head. Calibration measurements for disks of the same thin film structure from different manufacturers produce similar calibration results. This indicates that the calibration technique is robust and reliable. The processing circuit 920 combines the measured intensity of the reflected beam in the cross polarization with the calibration data to generate an output.

TABLE 1

| Disk ID | Pit Depth (nm) | Flying Height/Spin Speed (nm/Krpm) | Flying Height/DC RO Level (nm/mV) | DC RO Level/Flying Height (mV/µinch) |
|---|---|---|---|---|
| 1 | 82 | 25 | 0.80 | 32 |
| 2 | 58 | 26 | 0.89 | 28 |

Another suitable optical signal for monitoring the air gap is the evanescently-coupled part of the reflected light from the optical head 140. This is suggested by the curves 820A, 820B, and 820C in FIGS. 8A, 8B, and 8C. In general, light may be coupled through the air gap in two different ways. One part of the energy is the non-propagating part which has an incident angle greater than the critical angle of the total internal reflection and would be prohibited from coupling through the air gap when the air gap is much greater than one wavelength (e.g., several wavelengths). This non-propagating part of the energy, regardless of its polarization, is coupled by the evanescent fields and hence essentially exponentially decays as the air gap increases. In the near-field configuration where the air gap is less than one wavelength, the non-propagating part is significant and is highly sensitive to the air gap in a monotonic manner. Therefore it can be used to monitor the spacing variation.

In addition to the non-propagating part, the reflected light also has a propagating part. Due to the interference, the intensity of the propagating part varies sinusoidally with the air gap as indicated by curves 830A, 830B, and 830C in FIGS. 8A, 8B, and 8C. This lack of monotonic relation between the signal variation of the propagating part and the air gap makes the non-propagating part a better candidate for measuring the air gap than the propagating part. Hence, a spatial filter may be positioned in the optical path of the reflected light to separate the non-propagating part from the propagating part in the reflected light so that the intensity of the non-propagating part can be measured by a photodetector to determine the air gap and its variation. This spatial filter may be designed to block the propagating part in the central region of the reflected beam.

Figure 12:
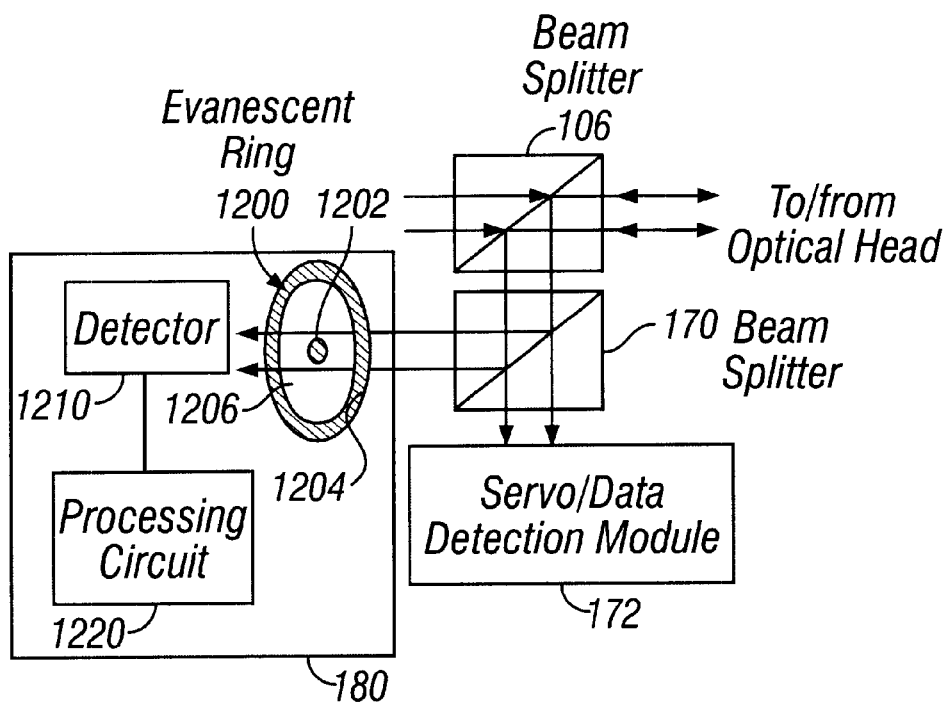
FIG. 12 shows one embodiment of a space detection module for the disk drive in FIGS. 1A and 1B by sensing the non-propagating light in the reflected optical wave from the optical head.

FIG. 12 shows one configuration of the spacing detection module 180 in the disk drive of FIGS. 1A and 1B to monitor the spacing variation by sensing only the non-propagating part of the reflected light. A ring-shaped spatial filter 1200 is disposed relative to the beam splitter 170 as a signal-selecting device to transmit the non-propagating light while blocking the propagating light. The spatial filter 1200 has a central opaque part 1202 to block the propagating light which have incident angles less than the critical angle for the total internal reflection from the air to the optical head 150. An outer opaque part 1204 and the central part 1202 defines a transparent ring 1206 to transmit the non-propagating light. A photodetector 1210 receives and detects the non-propagating light. A processing circuit 1220 processes the signal from the detector 1210 to determine the spacing variation or the absolute spacing. A similar calibration can be made to determine the exponential dependence of the intensity of the non-propagating light and the air gap spacing.

The above techniques may also be used in optical systems other than near-field optical disk drives. For example, an optical inspection instrument may be built for examining the surface quality of mass-produced disks. As addressed above, operations of a near-field optical disk drive can be adversely affected by variations in the air gap spacing between the optical head and the disk. Such spacing variations may be caused by poor surface quality of the optical disk. Hence, flatness and surface quality of disks for use in near-field optical disk drives may be limited within a predetermined tolerance range.

For example, an optical disk may have certain surface undulations (i.e., micro-waviness) caused during manufacturing. In general, the optical head floating over the disk surface would follow the surface contour so that the air gap spacing would not change significantly. However, if the surface undulations change with spatial periods smaller than the width of the slider, the head would not be able to follow the surface contour based on the air bearing action. Hence, the spacing between the optical head and the disk surface would change to cause undesired variations in the reflected optical signals.

Figure 13A:
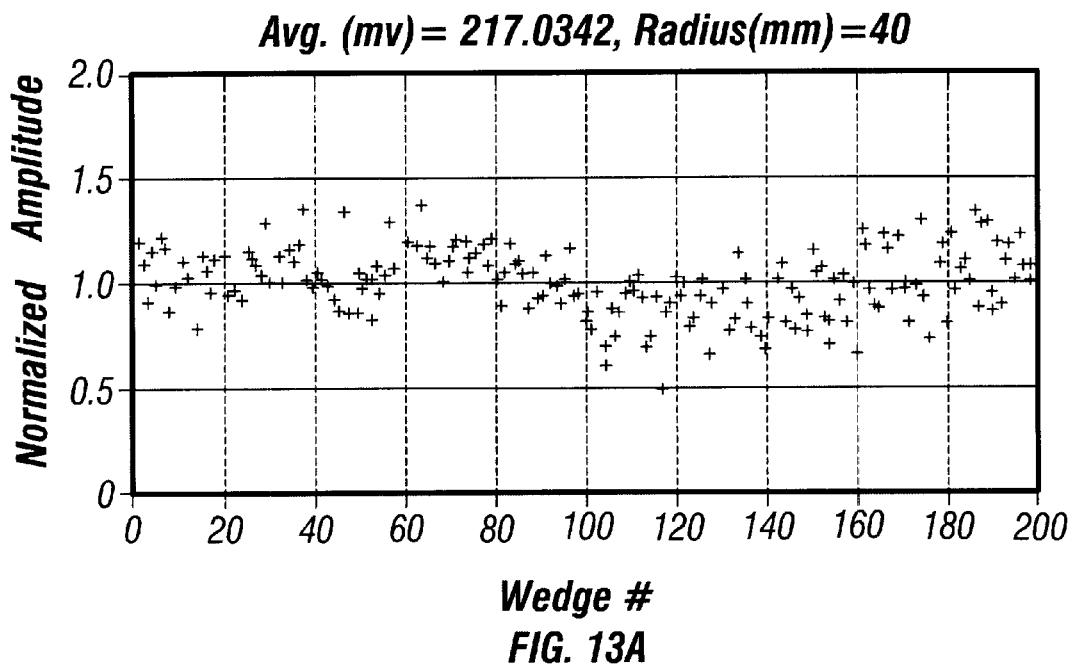
FIGS. 13A and 13B show measured read-only signals from two different disks as a function of their wedge address for the wedges circumferentially arranged on the disk surface.
Figure 13B:
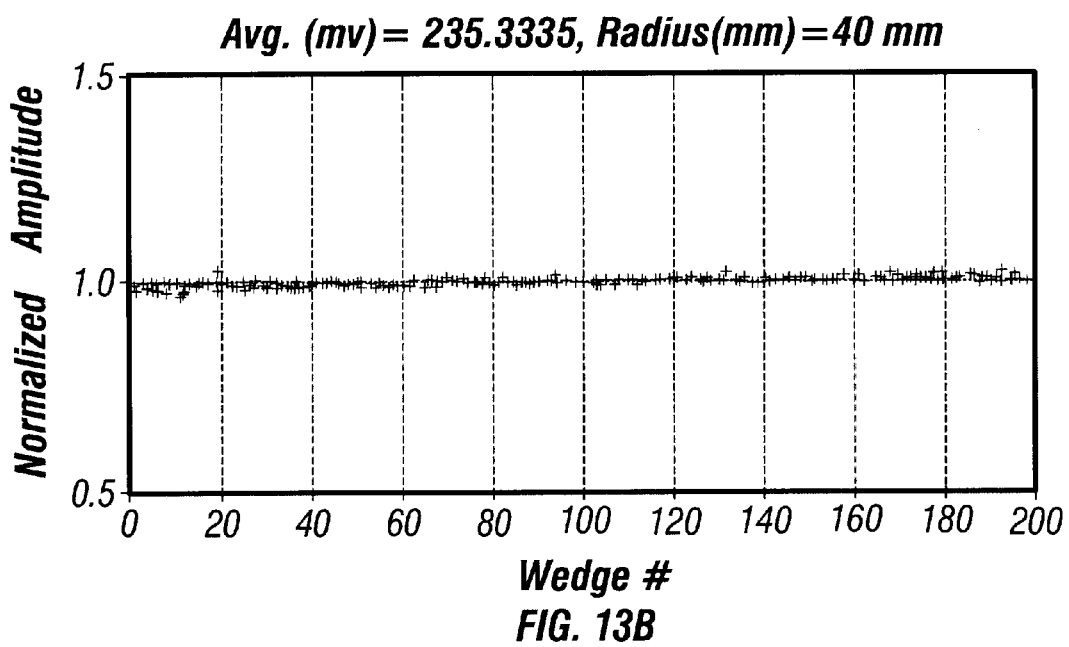

FIGS. 13A and 13B show measured read-only signals from two different disks A and B as a function of their wedge address for the wedges circumferentially arranged on the disk surface. Both disks A and B are processed using the same stamper so that their pre-format patterns are identical. But the disks A and B are molded under different conditions to have different degrees of microwaviness. The measured microwaviness of the disks A and B is about 1.68 and 0.89 micro inch, respectively. The variation in the read-only signal for the disk A shown in FIGS. 13A is much larger than that for the disk B shown in FIG. 13B.

When the degree of the microwaviness is greater than a predetermined threshold, the associated signal variations in the read-only signal and other signals may be beyond a tolerance range for normal operation of disk drives. In this context, such a disk is defective and cannot be used. Hence, it is desirable to inspect mass-produced disks for near-field disk drives in order to control the production quality in disk fabrication. One aspect of the present disclosure is to use the above spacing detection techniques in a near-field configuration to construct an inspection system for measuring microwaviness of optical disks.

Figure 14:
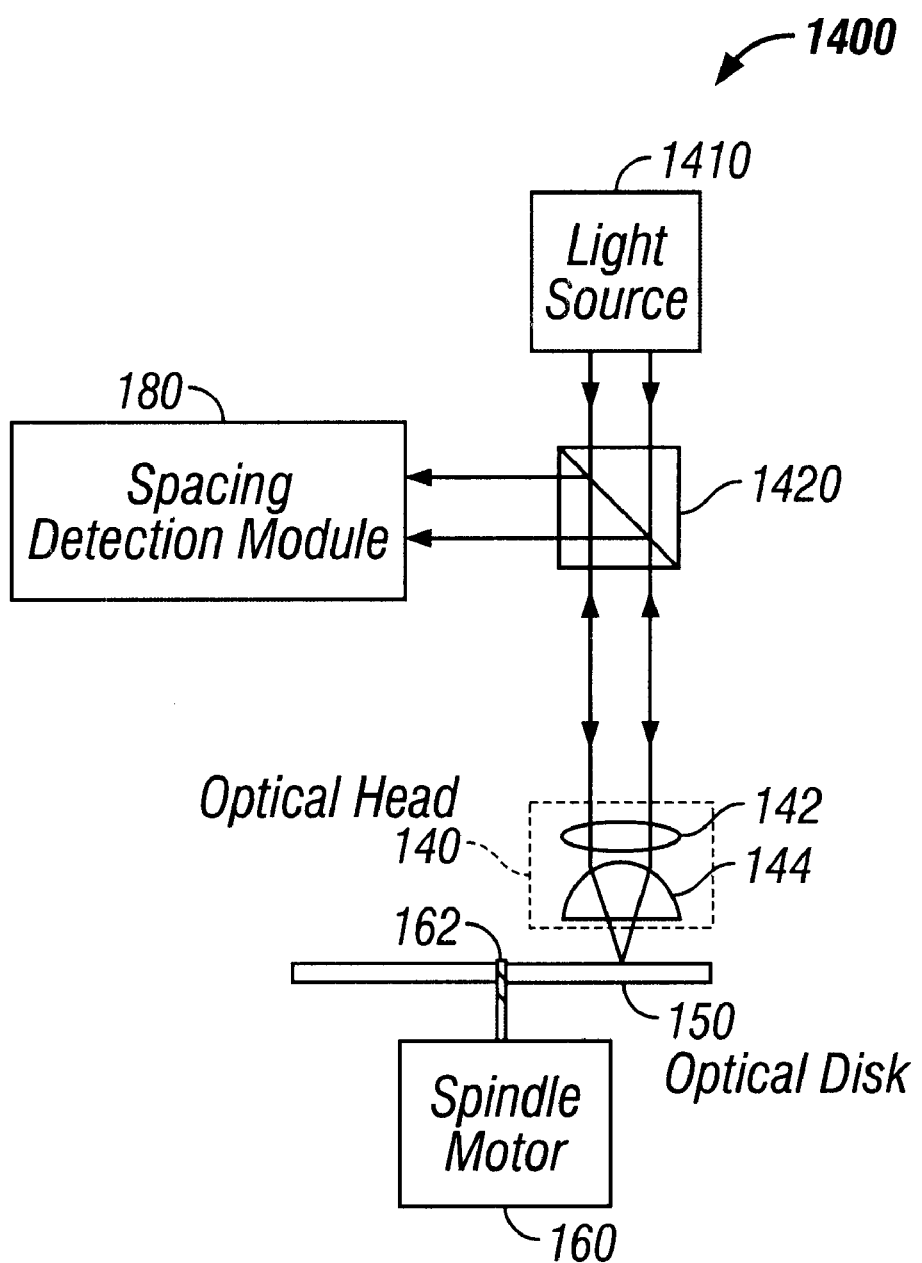
FIG. 14 shows one embodiment of an optical inspection system based on intensity variation with the air gap spacing from evanescent coupling.

FIG. 14 shows one embodiment of an optical inspection system 1400 based on intensity variation with the air gap spacing from evanescent coupling. Similar to the disk drive shown in FIG. 1A, the system 1400 uses spindle motor 160 to spin a disk 150 around a spindle 162. A flying optical head 140 is suspended over the disk by an air bearing action in a near-field configuration. A light source 1410 produces an input beam for inspection. A beam splitter 1420 directs the reflected beam to the spacing detection module 180 which may be in configurations shown in FIGS. 9 and 12.

The processing circuit in the module 180 may periodically sample the intensity of a selected optical signal with proper signal filtering from the reflected light. The processing circuit may also use the spindle index mark signal form the disk under inspection to obtain the location information of the sampled signals. Hence, an air gap map of the disk can be generated. The location information may alternatively be obtained from the positioning information of the actuator. In yet another alternative, the location information of the sampled signals may be obtained optically from the embossed pre-format marks on the disk. The track number identifies the radial location and the wedge number identifies the circumferential location.

The inspection system 1400 may also be used to inspect magnetic disks. Magnetic disks do not have preformed marks as in optical disks. The position can be determined by using the index of spindle (e.g., the amount of rotation with respect to a reference mark on the spindle) to indicate the azimuthal position and the radial position of the head with respect to the center of the magnetic disk where the disk is engaged to the spindle. Hence, a surface variation map can be obtained from a magnetic disk.

Although a few embodiments have been described, various modifications and enhancements may be possible without departing from the following claims.

What is claimed is:

1. A near-field optical system, comprising:
   an optical head receiving an incident radiation beam with a linear input polarization and having an optically transparent interfacing surface that couples said incident radiation beam at least in part by evanescent fields to and from a reflective surface that is spaced from said interfacing surface by a spacing less than one wavelength;
   an optical signal-selecting device disposed in an optical path of received radiation energy from the reflective surface to separate a radiation signal with a polarization perpendicular to the input linear polarization, that includes an evanescent-coupled component and varies with said spacing, from said received radiation energy;
   a radiation detector disposed to receive and convert said radiation signal into an electrical signal having information about said spacing; and
   a processing circuit coupled to process said electrical signal to determine information related to said spacing.

2. A system as in claim 1, wherein said signal-selecting device includes a polarizing beam splitter.

3. A system as in claim 1, wherein said signal-selecting device selects said radiation signal that only has radiation energy that is coupled by said evanescent fields.

4. A system as in claim 3, wherein said signal-selecting device includes a spatial filter shaped to transmit said radiation energy coupled by said evanescent fields to said detector while blocking radiation energy coupled by light propagation.

5. A system as in claim 1, wherein said optical head includes a solid immersion lens that has a spherical surface and an opposing flat surface, a portion of said opposing flat surface forms said interfacing surface.

6. A system as in claim 1, wherein said optical head has an air-bearing surface which supports said optical head over the reflective surface by an air bearing action.

7. A method for measuring a reflective surface, comprising:
   receiving an incident radiation beam with a linear input polarization by at least one lens;
   coupling the incident radiation beam from the lens to a transparent optical surface;
   coupling the incident radiation beam from the transparent optical surface to a reflective surface via an air gap at least in part by evanescent fields, wherein the air gap has a spacing less than one wavelength of the incident radiation beam;
   receiving a reflected radiation beam at the lens through the optical surface from the reflective surface;
   separating a selected radiation signal with a polarization perpendicular to said linear input polarization that changes monotonically with the spacing from other radiation signals in the reflected radiation beam;
   converting the selected radiation signal into an electrical signal; and
   processing the electrical signal to determine the spacing.

8. A method as in claim 7, wherein the selected radiation signal has only radiation energy that is evanescently coupled through the air gap.

9. A method as in claim 7, wherein the lens includes a solid immersion lens that has a spherical surface and an opposing flat surface, a portion of said opposing flat surface forms the transparent optical surface.

10. A method as in claim 7, wherein the reflective surface is a surface of an optical disk.

11. A method as in claim 7, wherein the reflective surface is a surface of a magnetic disk.

12. A near-field optical system, comprising:
    an optical head having an optically transparent interfacing surface and operable to couple radiation energy at least in part by evanescent fields to a position that is spaced from said interfacing surface by less than one wavelength of the radiation energy;
    a disk-holding device having a spindle engaged to a disk and a motor that rotates the disk with respect to said spindle;
    an actuator having an actuator arm to move and position said optical head over the disk so that a spacing between the disk and the interfacing surface of the optical head is less than one wavelength of the radiation energy;
    an optical signal-selecting device disposed in an optical path of received radiation energy from the disk by said optical head and configured to select a radiation signal polarized perpendicular to a polarization of an incident radiation beam received by said optical head, that varies with a spacing between said interfacing surface and the disk, from said received radiation energy;
    a radiation detector disposed to receive and convert said radiation signal into an electrical signal having information about said spacing; and
    a processing circuit coupled to process said electrical signal to determine said spacing.

13. A system as in claim 12, wherein the disk is a magnetic disk and said processing circuit is operable to produce a map of spacing between the disk and the interfacing surface of said optical head based on positioning of the disk with reference to a rotation index of said spindle as an azimuthal position and a radial position of said optical head with respect to said spindle.

14. A system as in claim 12, wherein the disk is an optical disk having preformed marks to indicate a position of said optical head over the disk, and said system further comprises a detection module positioned to receive a read-only signal in said received radiation energy from said optical head to extract information of said position based on said preformed marks.

15. A system as in claim 14, wherein said detection module is operable to detect a magneto-optic signal or a phase-change signal in said received radiation energy.

16. A system as in claim 12, wherein said signal-selecting device includes a polarizing beam splitter.

17. A system as in claim 12, wherein said signal-selecting device selects said radiation signal which has only radiation energy evanescently coupled between said interfacing surface and the disk.

18. A system as in claim 17, wherein said signal-selecting device includes a spatial filter shaped to transmit said radiation signal to said detector while blocking other radiation signals that are not evanescently coupled.

19. A system as in claim 12, wherein said optical head has an air-bearing surface which supports said optical head over the disk by an air bearing action.

20. A method for measuring a reflective surface, comprising:

causing an incident radiation beam with a linear input polarization to be coupled through a transparent optical surface to a reflective surface via a gap between the transparent optical surface and the reflective surface at least in part by evanescent coupling, wherein the gap is less than one wavelength of the incident radiation beam;

causing a reflection of the incident radiation beam from the reflective surface to be coupled through the gap and the transparent optical surface at least in part by evanescent coupling to produce a reflected beam;

causing a portion of the reflected beam to be separated from other portions, wherein the separated portion has a cross polarization perpendicular to said linear input polarization and changes monotonically with the thickness of the gap;

causing the separated portion to be converted into an electrical signal; and causing the electrical signal to be processed to determine the thickness of the gap.

21. A method as in claim 20, wherein the separated portion is selected to have only evanescently-coupled energy.

22. A method as in claim 20, further comprising:

causing values of a property of the separated portion with respect to different values of the thickness of the gap to be measured to establish a relation between the thickness of the gap and the values of the property; and wherein the processing of the electrical signal uses the relation to determine the thickness of the gap.

23. A method as in claim 20, further comprising causing different locations of the reflective surface to be measured to determine a degree of flatness of the reflective surface.

* * * * *